United States Patent [19]
Gaetano

[11] Patent Number: 6,016,908
[45] Date of Patent: Jan. 25, 2000

[54] METHOD AND APPARATUS FOR PACKAGING A COMPACT DISC

[75] Inventor: Ralph R. Gaetano, Bethel Park, Pa.

[73] Assignee: Think, Inc., West Mifflin, Pa.

[21] Appl. No.: 09/001,685

[22] Filed: Dec. 31, 1997

[51] Int. Cl.[7] ............................. B65D 85/30; B65D 85/57
[52] U.S. Cl. ....................................... 206/308.1; 206/312
[58] Field of Search ................................ 206/308.1, 310, 206/311, 312

[56] References Cited

U.S. PATENT DOCUMENTS

| | | | |
|---|---|---|---|
| 4,240,240 | 12/1980 | Cohen | 53/410 |
| 4,905,831 | 3/1990 | Bagdis et al. | 206/444 |
| 5,248,032 | 9/1993 | Sheu et al. | 206/312 |
| 5,255,785 | 10/1993 | Mackey | 206/444 |
| 5,472,083 | 12/1995 | Robinson et al. | 206/308.1 |
| 5,662,217 | 9/1997 | Durr | 206/308.1 |

FOREIGN PATENT DOCUMENTS

| | | | |
|---|---|---|---|
| 759809 | 5/1967 | Canada | 217/21 |

*Primary Examiner*—David T. Fidei
*Attorney, Agent, or Firm*—Price & Adams

[57] ABSTRACT

A sheet of foldable material is die cut to form a support area to receive a compact disc. The sides of the disc support area have a length substantially equal to the diameter of the compact disc. A triangular flap extends from each side of the disc support area and is connected thereto by double fold lines forming an edge for articulation of pairs of flaps between an open position for receiving the disc and a closed position. In the closed position, the surface of the flaps are removed from contact with the disc readable surface. In the closed position, a first pair of flaps abut one another in a wedged fit preventing articulation of the flaps into contact with the disc readable surface. The second pair of flaps is folded into overlying relation with the first pair of flaps. The folded flaps are releasably connected to close the package so that the interior surface of the package is removed from contact with the disc readable surface. The disc is moved into and out of the package without the disc readable surface sliding on the surface of the package. During storage and handling of the disc in the package, the readable surface does not contact the interior surface of the package.

20 Claims, 14 Drawing Sheets

METHOD AND APPARATUS FOR PACKAGING A COMPACT DISC

BACKGROUND OF THE INVENTION

1. Field of the Invention

This invention relates to packaging for compact discs and, more particularly, to a one piece package having foldable flaps that engage one another in surrounding relation with the disc to form a rigid chamber that protects the disc from damage during storage and handling of the package where the folded surfaces of the package are removed from contact with the readable surface of the disc.

2. Description of the Prior Art

The popularity of compact discs ("CD's") for storing digitally recorded music and read-only memory (ROM) for computers has created a demand for packaging CD's for storage and handling that is economical to manufacture and environmentally sound. Initially, CD's were stored in a rigid plastic container known as a "jewel box". The jewel box was desirable because it formed a rigid container in which the surrounding plastic walls of the container are removed from contact with the readable surface of the disc containing the recorded music or computer data.

A conventional jewel box includes a hinged cover that is snapped in place at one edge to provide sufficient access to insert and remove the disc from the storage chamber. The disc is not slid into position between overlying layers; instead, the lid of the jewel box is opened and the disc is placed on the exposed base of the plastic container. At no time during insertion or removal of the disc or storage of the disc does the readable portion contact the surface of the container. The peripheral edge of the disc not containing recorded data contacts the container to restrain lateral movement of the disc in the box. The readable portion does not contact any surrounding surface of the box.

The jewel box construction provides a number of desirable features for the storage and handling of compact discs. Nevertheless, its advantages are regarded as being substantially outweighed by the current recognition that the plastic material is not recyclable. Disposal of a plastic jewel box presents ecological problems that demand an alternate construction.

As an alternative to the plastic jewel box, a number of paperboard containers have been proposed for the storage and handling of compact discs, as well as floppy diskettes for computers. The proposed containers have the basic construction of the well known sleeve or jacket that has been used for many years for the storage of vinyl records. The jacket or sleeve is fabricated of thick paper or paperboard stock and is die cut and folded to form multiple layers in a wallet-style pocket open at only one end into which the compact disc is slid into position. One of the essential features of the jacket is that the opposing walls of the jacket forming the sleeve or chamber must be stiff so as to resist bending.

U.S. Pat. No. 5,248,032 discloses a compact disc jacket constructed from a unitary sheet of double-walled paperboard. The jacket includes a base panel connected to side panels and end panels. The panels are folded into overlying relation and glued to one another to form a hollow chamber which is open only at one end. With this construction the walls positioned opposite the readable portion of the disc have multiple thicknesses of material which provides the desired stiffness to resist bending of the jacket. The interior surfaces of the double-walled chamber are coated to minimize wear of the disc as it is repeatedly inserted into and removed from the jacket.

U.S. Pat. No. 5,662,217 discloses a compact disc sleeve package, also constructed from a unitary piece of heavy gauged paper, folded in a manner to form an envelope having a sleeve portion and a folding front cover. The cover has a flap which tucks into a slot cut into the sleeve portion. As with all compact disc holders fabricated of paper, the exterior surfaces are printed with any desired information which is not possible with the plastic jewel box. The integral square sections of the die cut paper are folded along fold lines to form the envelope having a restricted opening through which the disc is slid into the sleeve portion. The opening is sealed by the envelope-style flap. Again, with the envelope-style construction, the readable side of the disc contacts the interior pocket walls as it is inserted and removed from the sleeve and during storage in the sleeve.

In U.S. Pat. No. 5,472,083, the compact disc is positioned in a sleeve having three folded panels. One of the panels is folded into overlying relation with the readable portion of the disc. The sleeve is then inserted into the pocket of a separate envelope, also formed by die cutting a single unitary sheet of paperboard stock. The sleeve containing the CD is slipped into the open pocket of the envelope. The open pocket is closed by folding a closure panel over the pocket and into a slot of an underlying panel. The overlying layers of the sleeve and envelope provide a multiple walled enclosure pressed against the readable surface of the disc.

U.S. Pat. Nos. 4,905,831 and 5,255,785 are further examples of envelopes and packages fabricated from a unitary piece of paperboard stock which is die cut and folded to form panels. The panels are folded along crease lines to form a protective envelope with a restricted opening through which a floppy computer disk is slid into and out of position.

The above described embodiments of sleeves and jackets for a compact disc include pockets open only at one end through which the CD is inserted and removed. An alternate construction to the envelope or wallet-style holder for a disc-like object is disclosed in Canadian Patent No. 759,809. A record package is formed from a unitary sheet of corrugated paper having a rectangular base with flaps extending from each side of the base. The record is positioned on the rectangular base. The side flaps are folded into overlying relation with the record and secured to one another to close the package and rigidly hold the record in place. This avoids the problem of sliding the record on the surface of the paper to insert and remove it from the package. However, the folded flaps when engaged to one another to close the package are pressed against the surface of the record.

It is also been proposed, as disclosed in U.S. Pat. No. 4,240,240, to utilize a container having the configuration of a jewel box with a piece of foam material secured to the base of the box. A cutout portion of the foam is secured to the lid. The object to be protected is positioned in the recessed area of the foam on the base. When the lid is closed the foam cutout portion overlies the object on the base to provide a cushioned enclosure of the object within the box.

The above described prior art paperboard packaging for compact discs is an alternative to the plastic jewel box. However, the paperboard package requires the readable portion of the disc to be slid in contact with the interior surface of the package. During storage and handling of the package, the readable portion of the disc is also in contact with the package. Over a period of time this creates wear of the readable portion of the disc.

Therefore, there is need for a compact disc package fabricated of paperboard stock, as a substitute for plastic containers, die cut to form an enclosure which protects the disc and removes the disc readable surface from contact with the interior surface of the package when it is inserted and removed and when stored in the package for handling.

SUMMARY OF THE INVENTION

In accordance with the present invention there is provided a package for holding a compact disc that includes a unitary rectangular sheet of foldable material die cut to form a disc support area. The disc support area has four sides of equal length and substantially corresponding in length to the diameter of the compact disc to facilitate positioning and removal of the compact disc from the support area. A triangular flap extends from each side of the disc support area. The flap has a base portion integrally connected to the disc support area by a fold line permitting articulation of the flap relative to the disc support area. The flap has a free edge. A first pair of the flaps extends from opposite sides of the disc support area. A second pair of the flaps extends from opposite sides of the disc support area. The first and second pairs of flaps are movable to an open position for exposing the disc support area to receive the compact disc removed from contact with the first and second flaps. The first and second pairs of flaps are movable to a closed position. In the closed position, the first pair of flaps is folded into abutting contact with one another in a position supported above and out of contact with the compact disc. The second pair of flaps are then folded into a position over the first pair of folded flaps and out of contact with the compact disc. The second pair of flaps are connected to one another in the closed position.

Further in accordance with the present invention, there is provided a method for packaging a compact disc that includes the steps of positioning a compact disc on a disc support area of a sheet of foldable material with a readable side of the compact disc facing upwardly and removed from contact with the disc support area. First and second pairs of oppositely positioned flaps are integrally connected to the disc support area and extend therefrom. The first and second pairs of flaps are folded from an open position providing access to the disc support area for positioning the compact disc thereon to a closed position where the first and second pairs of flaps are folded into contact with the peripheral edge of the compact disc to restrain movement of the compact disc on the disc support area. The first pair of flaps are folded into abutting contact with one another and out of contact with the readable surface of the compact disc in the closed position. The second pair of flaps are folded into overlying relation with the first pair of flaps to maintain the second pair of flaps out of contact with the readable surface of the compact disc. The second pair of folded flaps are connected to one another in the closed position.

In addition, the present invention is directed to a package for holding a compact disc that includes a unitary rectangular sheet of material die cut to form a disc support area having four sides of equal length corresponding substantially in length to the diameter of the compact disc. A triangular flap extends from each side of the disc support area. The triangular flap has a base portion integrally connected to the disc support area by a fold line permitting articulation of the flap relative to the base. The flap has a free edge. A first pair of flaps is positioned on opposite sides of the disc support area. Each flap has a length extending from the base portion to the free edge greater than one half the diameter of the disc. The first pair of flaps is folded about the base portion into overlying relation above the disc on the disc support area until the opposed free edges abut one another to restrain movement of the flaps into contact with the disc and bias the flaps away from the surface of the disc. A second pair of flaps is positioned on opposite sides of the disc support area. Each of the second pair of flaps has a length extending from the base to the free edge greater than one half the diameter of the disc. One free edge of the second pair of flaps has a slot extending across the free edge substantially parallel to the flap base portion. A second free edge of the second pair of flaps extends into the slot until movement of the flap second free edge is restrained to bias the second pair of flaps away from the surface of the disc to close the package forming a cushion of air around the disc.

Accordingly, a principal object of the present invention is to provide method and apparatus for packaging a compact disc in a foldable container which restrains sliding movement of the disc in the container and surrounds the disc with a cushion of air so that the interior of the container does not contact the readable portion of the disc.

Another object of the present invention is to provide a compact disc package formed of die cut paperboard to permit insertion and removal of the disc from the package without sliding the readable portion of the disc in contact with the interior surfaces of the package.

An additional object of the present invention is to provide a method of packaging a compact disc within a foldable container die cut from sheet material having multiple layers folded in surrounding relation with the disc to form a cushion of air to protect the disc and prevent contact of the readable portion of the disc when sealed within the container.

A further object of the present invention is to provide a disc package fabricated of sheet material operable to be folded and unfolded into surrounding relation with the disc where the folded layers of the package are connected to form a rigid chamber creating a cushion of air around the disc so that the readable surface does not contact the interior of the package when it is inserted and removed and when it is stored in the package for handling and transportation of the disc.

These and other objects of the present invention will be more completely disclosed and described in the following specification, the accompanying drawings and the appended claims.

DESCRIPTION OF THE PREFERRED EMBODIMENTS

Figure 1:
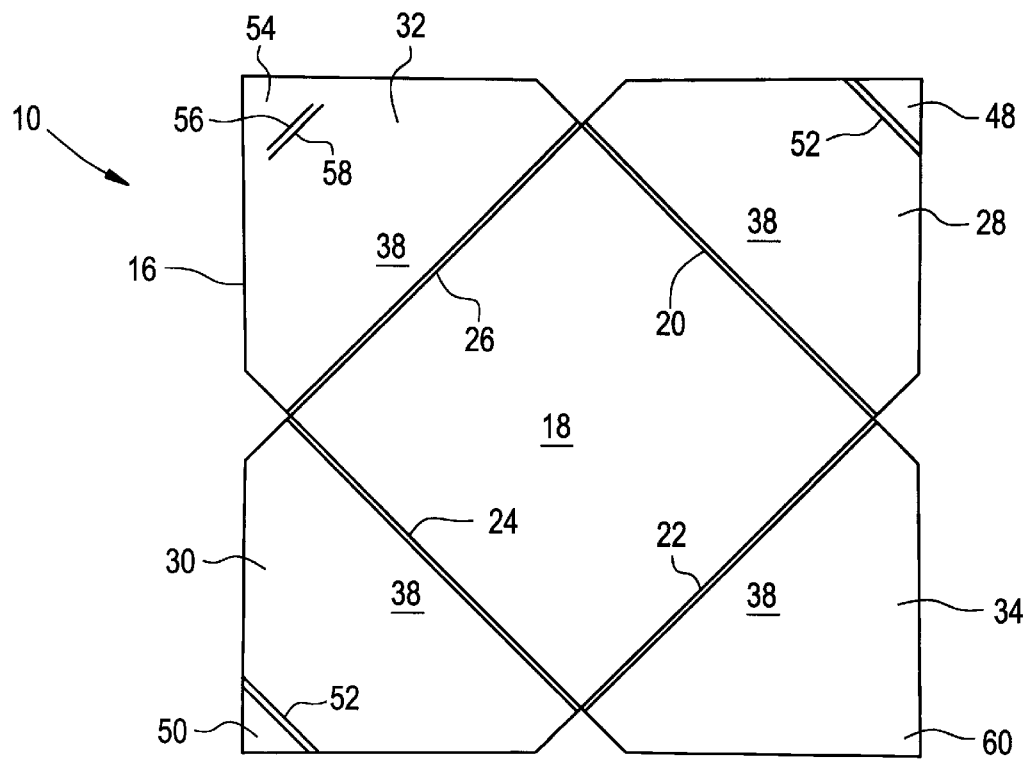
FIG. 1 is a top plan view of a sheet of paperboard stock die cut in a preselected configuration to form a compact disc package in accordance with the present invention.
Figure 2:
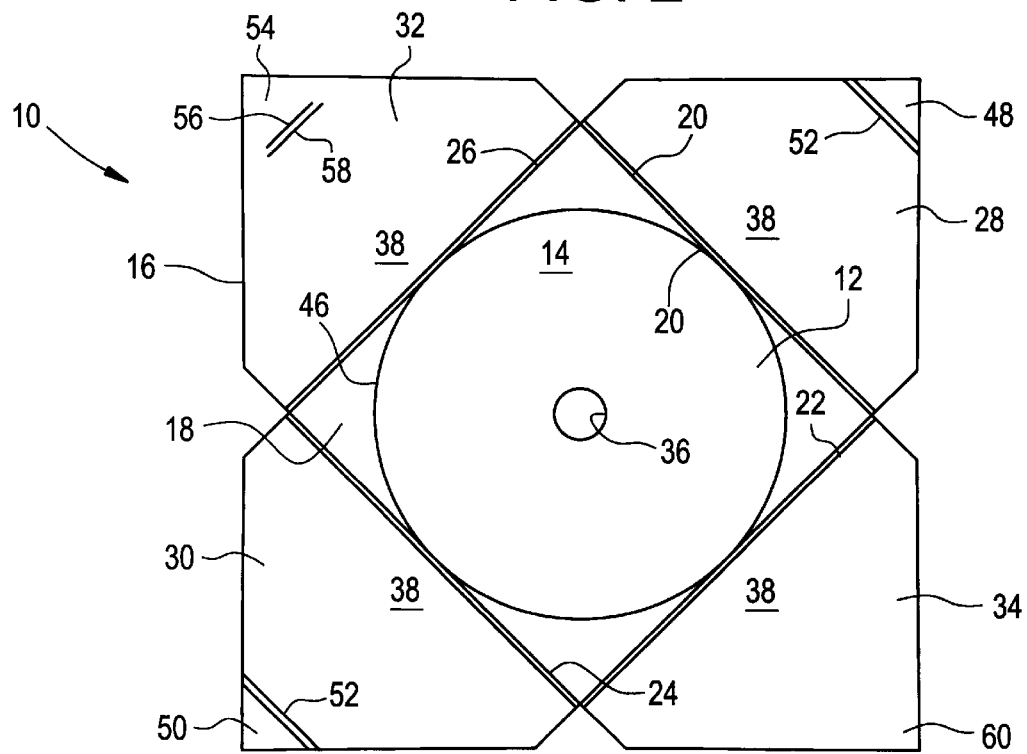
FIG. 2 is a plan view similar to FIG. 1, illustrating a compact disc in position on the sheet material before it is folded to enclose the compact disc in the package.

Referring to the drawings and, particularly, to FIGS. 1 and 2, there is illustrated a package generally designated by the numeral 10 for containing a compact disc 12, as shown in FIG. 2, in a manner that permits the disc to be easily moved into and out of position within the package 10 and enclosed in the package 10 within an air chamber to protect the disc 12 from damage. A readable surface 14 is provided on only one surface. The opposite surface of the disc does not contain readable data and may contact the package surface without concern for the effects of wear. On the other hand, it is desirable to maintain the disc readable surface 14 removed from contact with the surface of the packaging. This is important when the disc is inserted and removed from the package 10, as well as when the disc is stored in the package for handling.

The package 10 is formed from a single, unitary sheet 16 of material, such as paperboard stock, thick paper, flexible cardboard and like material which is capable of being folded. Most preferably, the sheet 16 is coated, as for example, with a water base paint to provide a printable surface and reduce the effects of paper dust.

The sheet 16 of foldable material is die cut in a preselected configuration, as illustrated in FIG. 1, to form a rectangular disc support area 18 having four sides 20, 22, 24, and 26 of approximate equal length. The length of each side 20–26 corresponds in length to the diameter of the compact disc 12 to facilitate positioning and removal of the disc 12 from the support area 18. The package 10 is shown in an open position in FIG. 1 and in a closed position in FIGS. 6–8.

A triangularly shaped flap extends from each side of the disc support area 18. A first pair of flaps 28 and 30 extend from opposite sides of the disc support area 18. A second pair of flaps 32 and 34 extend from opposite sides of the disc support area 18.

As shown in FIG. 1, the first pair of flaps 28, 30 and the second pair of flaps 32, 34 are in an open position fully exposing the disc support area 18. The disc 12 is placed on the support area 18 without contacting the flaps 28–32. During the disc insertion step, the flaps 28–32 are fully extended in the plane of the support area 18 so that there is no chance that the disc readable surface 14 comes in contact with any of the interior surfaces of the package 10.

Most preferably, the disc 12 is positioned on the support area 18 with the readable surface 14 facing up and removed from contact with the area 18. If for some reason, it is desired to position the disc 12 with the readable surface 14 positioned oppositely of the disc support area 18, a suitable support pad (not shown) is secured to the area 18 in the region of the disc 12 underlying hole 36 in the disc to support the surface 14 removed from contact with the area 18.

The triangular flaps 28-34 each have a base portion 38 integrally connected to the disc support area 18 by pairs of double fold lines 40 and 42 formed by conventional scoring of the sheet 16. The double fold lines 40 and 42 permit articulation of each flap 28–34 relative to the disc support area 18. With this arrangement, the flaps 28–34 are movable from the open position shown in FIG. 1 to the fully closed position shown in FIGS. 6–8. The double fold line 40, 42 formed at each longitudinal edge of the disc support area 18 forms a vertical edge 44, as shown in FIG. 7, of a preselected width or height.

Figure 3:
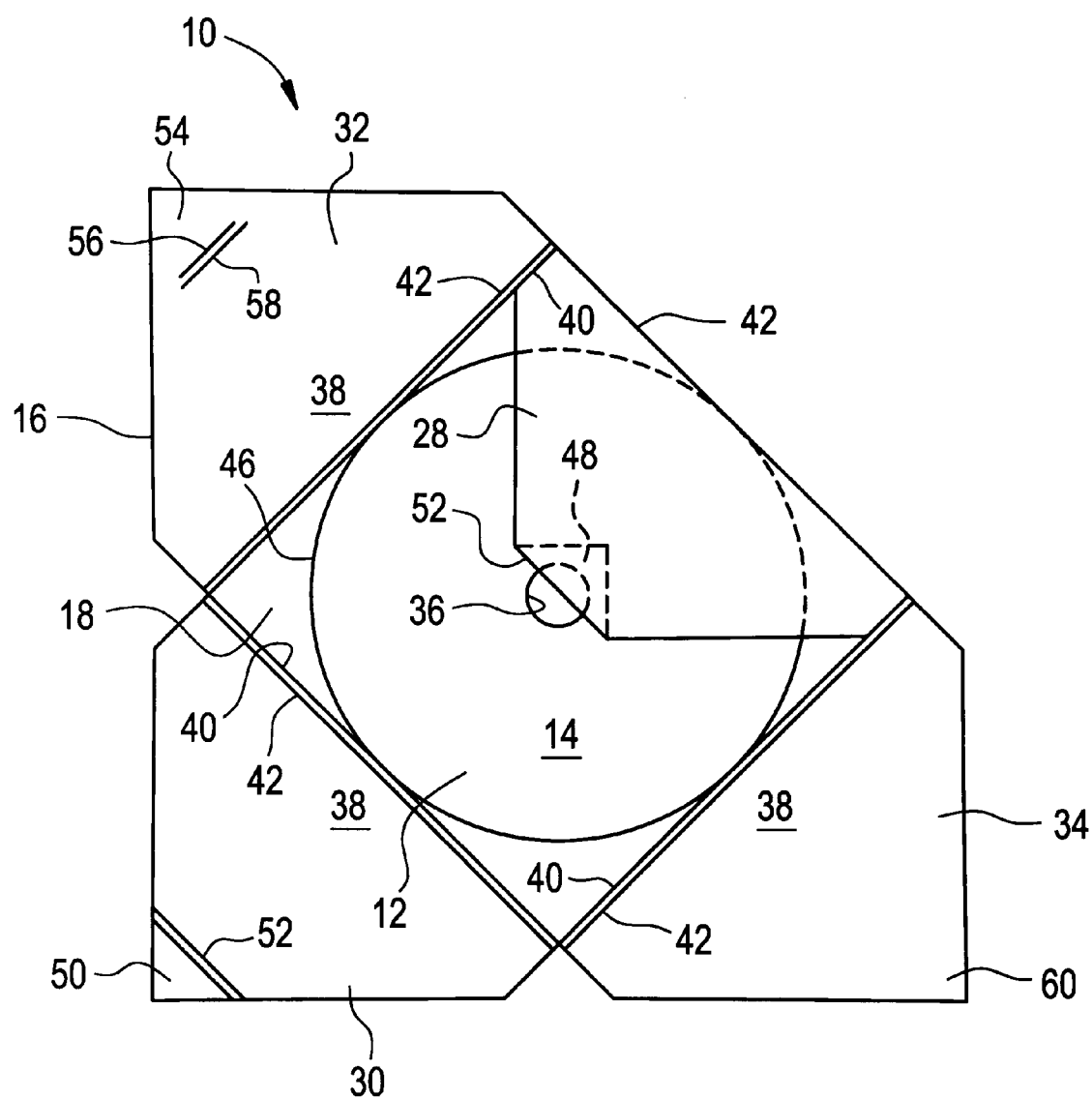
FIG. 3 is a top plan view of the compact disc package, illustrating the first step in folding one flap of a first pair of flaps into a closed position.
Figure 4:
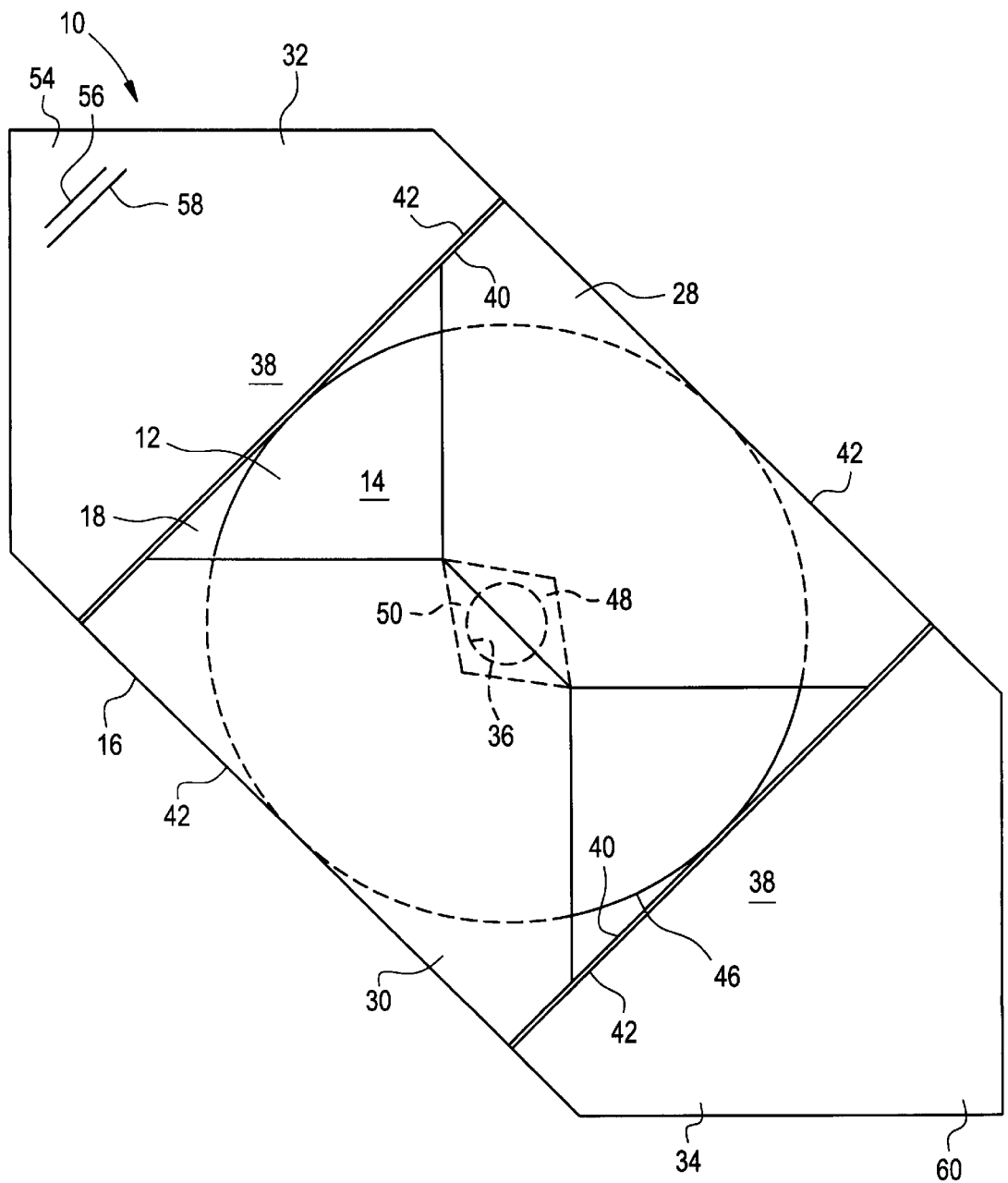
FIG. 4 is a plan view similar to FIG. 3, illustrating the opposite flap folded into abutting relation with the first folded flap to restrain movement of the two flaps into contact with the readable surface of the disc.

The fold lines 40 and 42 forming the vertical edge 44 are spaced a preselected distance apart to receive the disc 12. This provides an area for folding the pairs of flaps 28, 30, 32, 34 in overlying relation with the disc 12 removed from contact with the readable surface 14 of the disc 12. Also as shown in FIGS. 2 and 3, a peripheral edge 46 of the disc 12 abuts or is tangent to the interior fold line 40. Consequently, when the flaps 28–34 are sequentially folded, the disc peripheral edge 46 abuts the vertical edge 44 of the sheet 16 between the fold lines 40 and 42 to capture or confine the disc 12 on the disc support area 18. The disc 12 is restrained from sliding on the disc support area 18 by the surrounding contact of the edge 44 with the disc peripheral edge 46. For this reason, it is preferred that the sheet 16 be cut to provide the disc support area 18 with dimensions corresponding to the diameter of the disc to be stored in the package 10.

In the open position of the package 10 as shown in FIG. 2, the first pair of flaps 28, 30 and the second pair of flaps 30, 32 are fully extended in the plane of the disc support area 18. This permits insertion of the compact disc 12 in the package 10 without contacting the surfaces of the flaps 28, 30 and 32, 34. The present invention of inserting the disc 12 in the package 10 is distinguished from the known compact disc sleeves and jackets that require the disc to slide through a restricted opening with the readable surface frictionally engaging the interior surface of the package. Over a period of time repeated insertion and removal of a compact disc from the wallet-style jacket causes wear of the disc readable surface. This adversely affects the operability of the disc player to "read" the data stored on the surface 14 of the disc 12.

Figure 5:
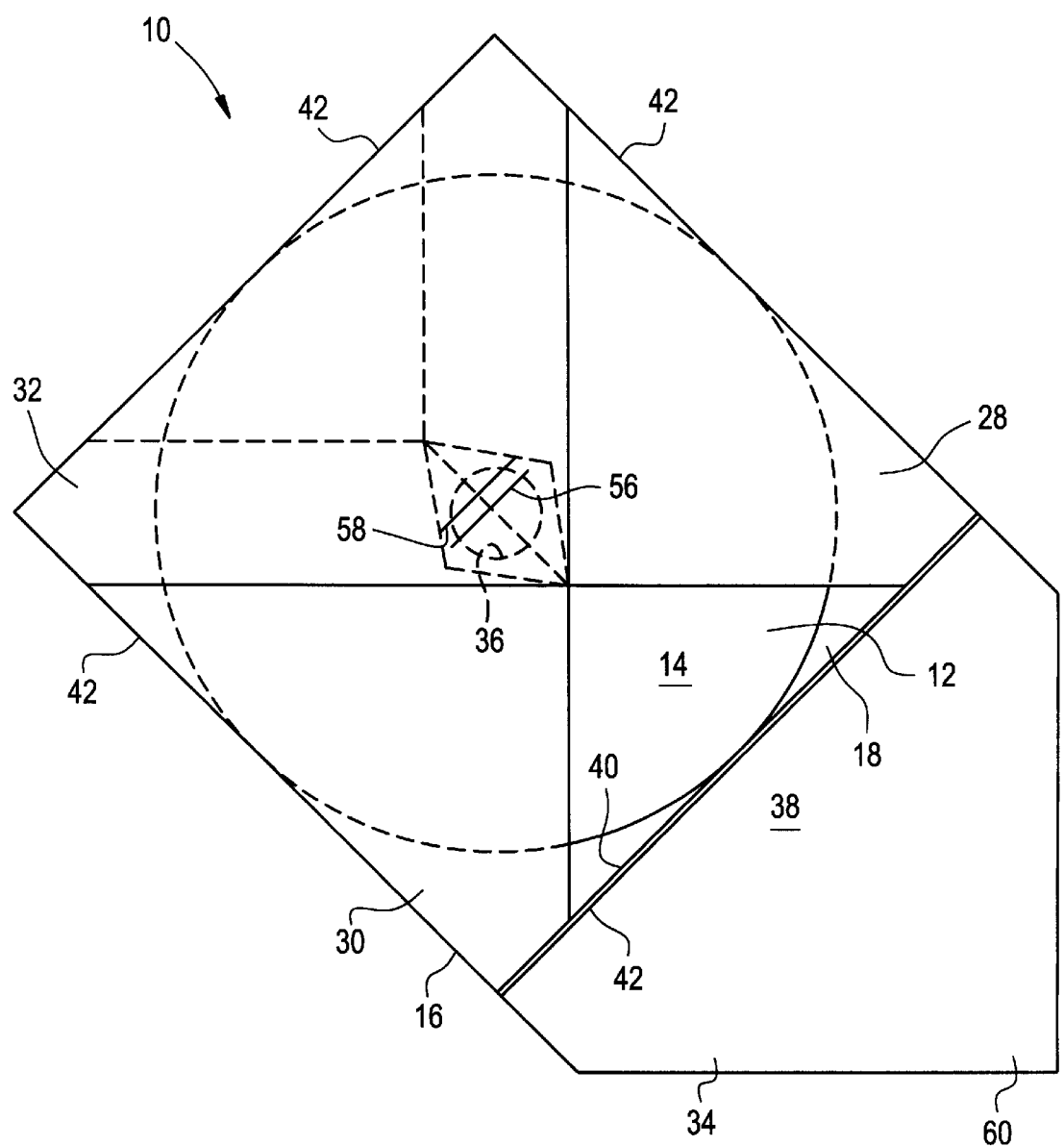
FIG. 5 is a top plan view of the package, illustrating the step of folding one of the second pair of flaps into overlying position with the first pair of folded flaps.
Figure 6:
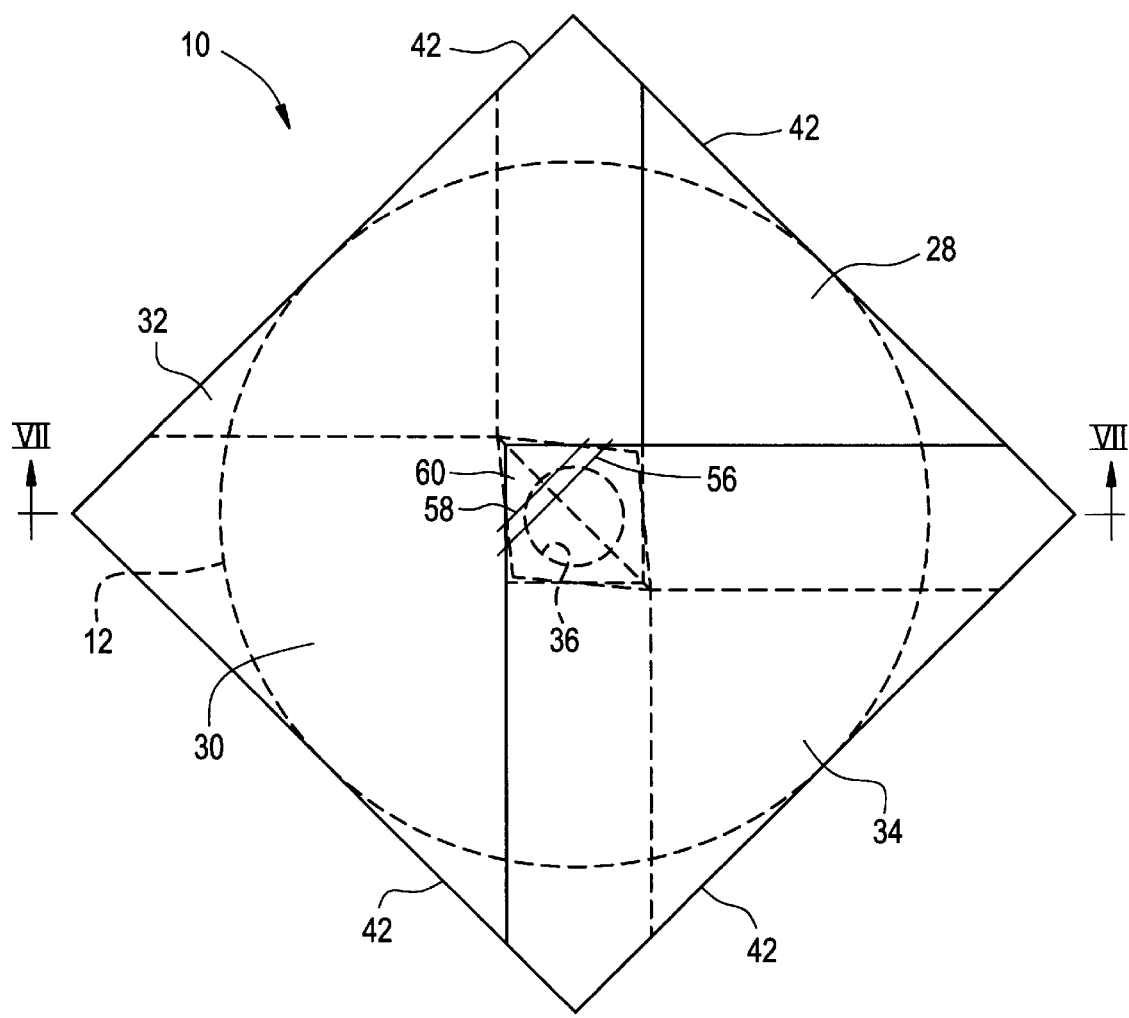
FIG. 6 is a plan view similar to FIG. 5, illustrating the step of folding the opposite flap of the second pair of flaps to engage a slit of the opposite flap to close the package in surrounding relation with the disc.
Figure 7:
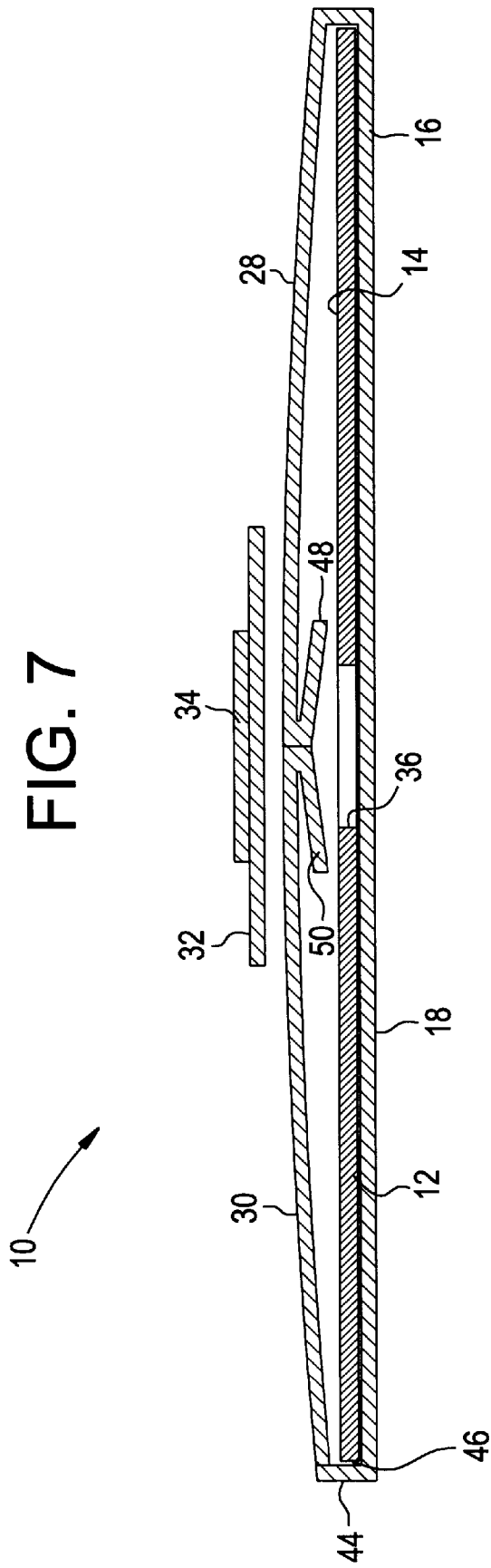
FIG. 7 is a sectional view in side elevation taken along line VII—VII of FIG. 6, illustrating the package in a closed position with the flaps folded to form multiple layers biased out of contact with the readable surface of the disc to form a cushion of air surrounding the disc.

To move the pairs of flaps from the open position shown in FIG. 1 to the closed position in FIG. 6, the pairs of flaps are folded in sequence, as illustrated in FIGS. 3–6. To create an air chamber around the disc 12, the flaps are folded in a manner to prevent their contact with the readable surface 14 of the disc 12. This is accomplished, in part, by the provision of the first pair of flaps 28–30 having at free end portions 48 and 50 double fold lines 52. The flap free end portions 48 and 50 are folded on the double fold lines 52 into underlying relation with the main body of each flap. As seen in FIG. 3, the flap free edge 48 is folded about the double fold line 52 into underlying relation with the flap 28.

In accordance with the present invention, the distance between the double fold lines 52 of the flap free edge 48 and the double fold lines 40, 42 surrounding the disc support area is greater than one half of the diameter of the disc 12. The flap 30 also has an equal dimension where the distance between the double fold lines 52 of the flap free edge 50 and the double fold lines 40, 42 is greater than one half the diameter of disc 12. The free edge 50 of flap 30 is folded about the double fold lines 52 in underlying relation with the flap 30. Thereafter, the flap 30 is articulated about the double fold lines 40–42 into overlying relation with the disc 12.

The opposite pair of flaps 28, 30 are folded toward one another until the double fold lines 52 of each flap abut one another to the extent that the flaps 28, 32 are constrained from further articulation toward the surface 14 of disc 12. In other words, as the flaps 28 and 30 are folded toward the surface 14 of the disc 12, they interfere with one another because their length exceeds one half the diameter of the disc. The flaps 28 and 30 are prevented from moving further downwardly into contact with the disc 12. Due to the stiffness of the sheet 16, the abutting contact of the folded flap free edges 48 and 50 holds the folded flaps in a position spaced above the disc surface 14. This creates a bulging of the flaps 28 and 30 to form a rigid chamber enveloping the disc 12. The surrounding chamber forms a cushion of air between the flaps 28, 30 and the disc surface 14.

It should be understood that the engagement of the folded flaps 28 and 30 removed from contact with the disc surface 14 is accomplished in a variety of methods. One additional method is the provision of a transverse slit in flap 30 at the free edge 50. The opposite flap 28 is folded so that the free edge 48 enters the slit in flap free edge 50. The flaps 28 and 30 are folded downwardly until the free edge 48 is restrained from further movement through the slit. This connects the folded flaps 28 and 30 in a position displaced from the disc surface 14 and forming an air chamber above the surface 14. Accordingly, the present invention includes any means of engaging the first pair of folded flaps 28 and 30 so that they do not contact the disc surface 14 when the package 10 is in the closed position.

As seen in FIG. 5, after the first pair of flaps 28, 30 are folded into abutting contact and overlying in spaced relation the disc readable surface 14, the second pair of flaps 32, 34 are folded into engagement with one another. In one embodiment, the flap 32 has at a free edge 54 a pair of slits 56 and 58 of a selected length and spaced apart, both being parallel to the double fold lines 40, 42. The opposite flap 34 of the second pair of flaps 32, 34 has a free edge 60 that is extended through the slots 56, 58.

As shown in FIG. 5, the flap 32 is folded about its base portion 38 into overlying relation with the folded first pair of flaps 28, 30. Thereafter as shown in FIG. 6, the flap 34 is folded so that the free edge 60 extends through the slits 56 and 58. In accordance with the present invention, a single slit 56 or a pair of slits 56, 58 are provided in the flap 32. The slits 56, 58 have a length which limits movement of the flap free edge 60 through the slits 56, 58.

When the flap free edge 60 is restrained from further movement on flap 32, flaps 32 and 34 are connected and restrained from further movement relative to each other. Due to the stiffness of the sheet material 16, the connected flaps 32, 34 are locked into position above the first pair of folded flaps 28, 30. This arrangement is shown in FIG. 7 where at the center of the closed package 10, the connected flaps 32, 34 are positioned above the abutting flaps 28, 30. All the folded flaps are removed from contact with the disc surface 14 forming a rigid walled air chamber surrounding the disc 12. In this manner, the disc is protected during storage and handling without generating any wear by contact of the disc readable surface 14 with the interior surface of the package 10.

Closure of the package 10 is completed when the second pair of folded flaps 32, 34 engage one another. The engagement of the second pair of flaps 32, 34 can be accomplished by a number of different mechanisms, such as male and female fastening elements secured to the respective flaps 32, 34. Tacky, adhesive-like areas on the flap free edges 54 and 60 permit the flaps to be engaged and disengaged without becoming permanently adhered to one another. The flap free edges 54, 60 can also be provided with the well known hook and loop fastener sold under the trademark "Velcro".

Upon connection of the second pair of flaps 32, 34, the package 10 is closed to securely retain the compact disc 12 therein. The position of the disc 12 in the closed package 10 is illustrated in FIG. 7. Due to the wedged engagement of the first pair of flaps 28, 30 and the connection of the second pair of flaps 32, 34, the closed package 10 forms a cushion of air or a bubble-like effect around the disc 12.

Figure 8:
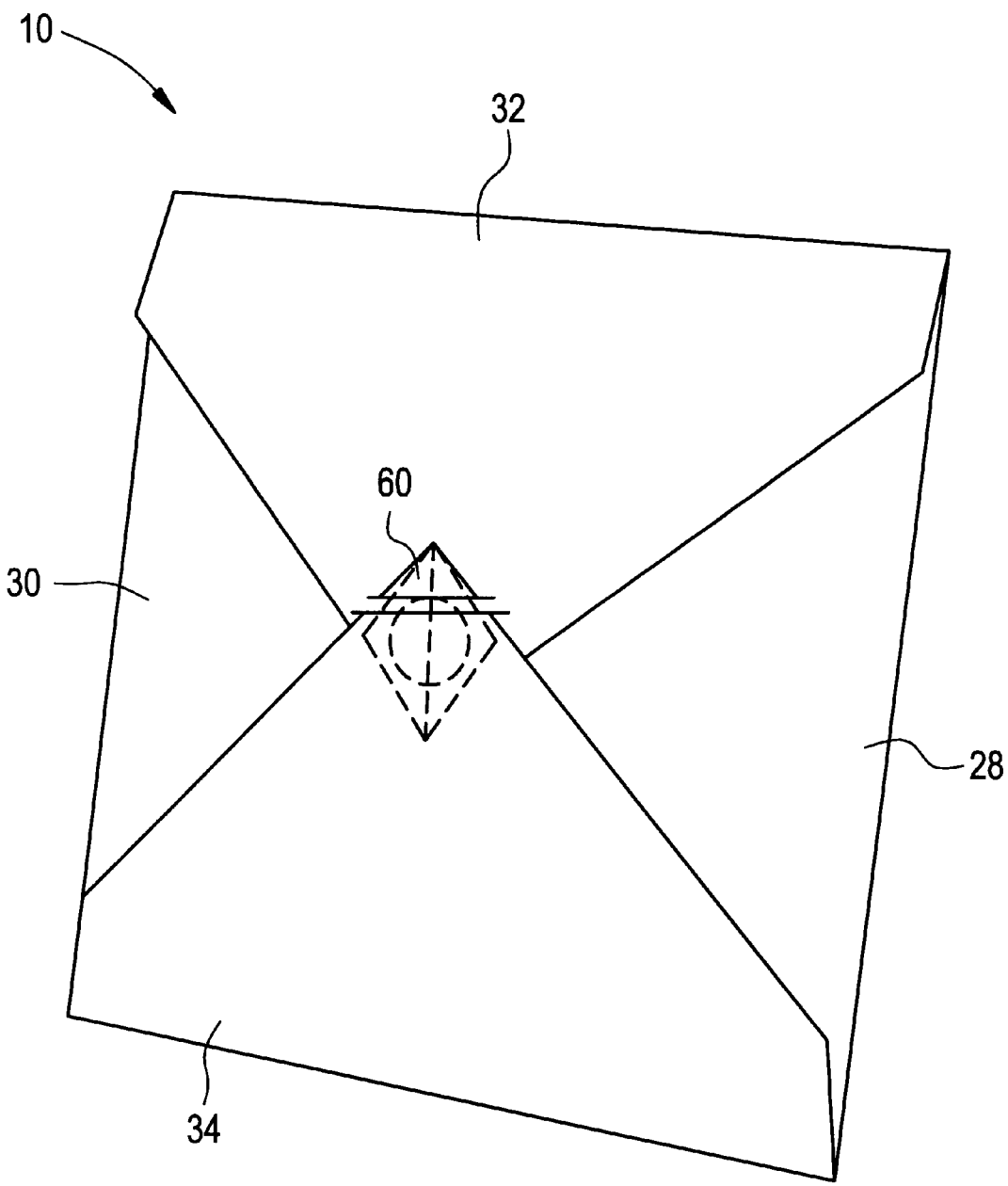
FIG. 8 is a isometric view of the compact disc package shown in FIGS. 6 and 7 in a closed position.
Figure 9:
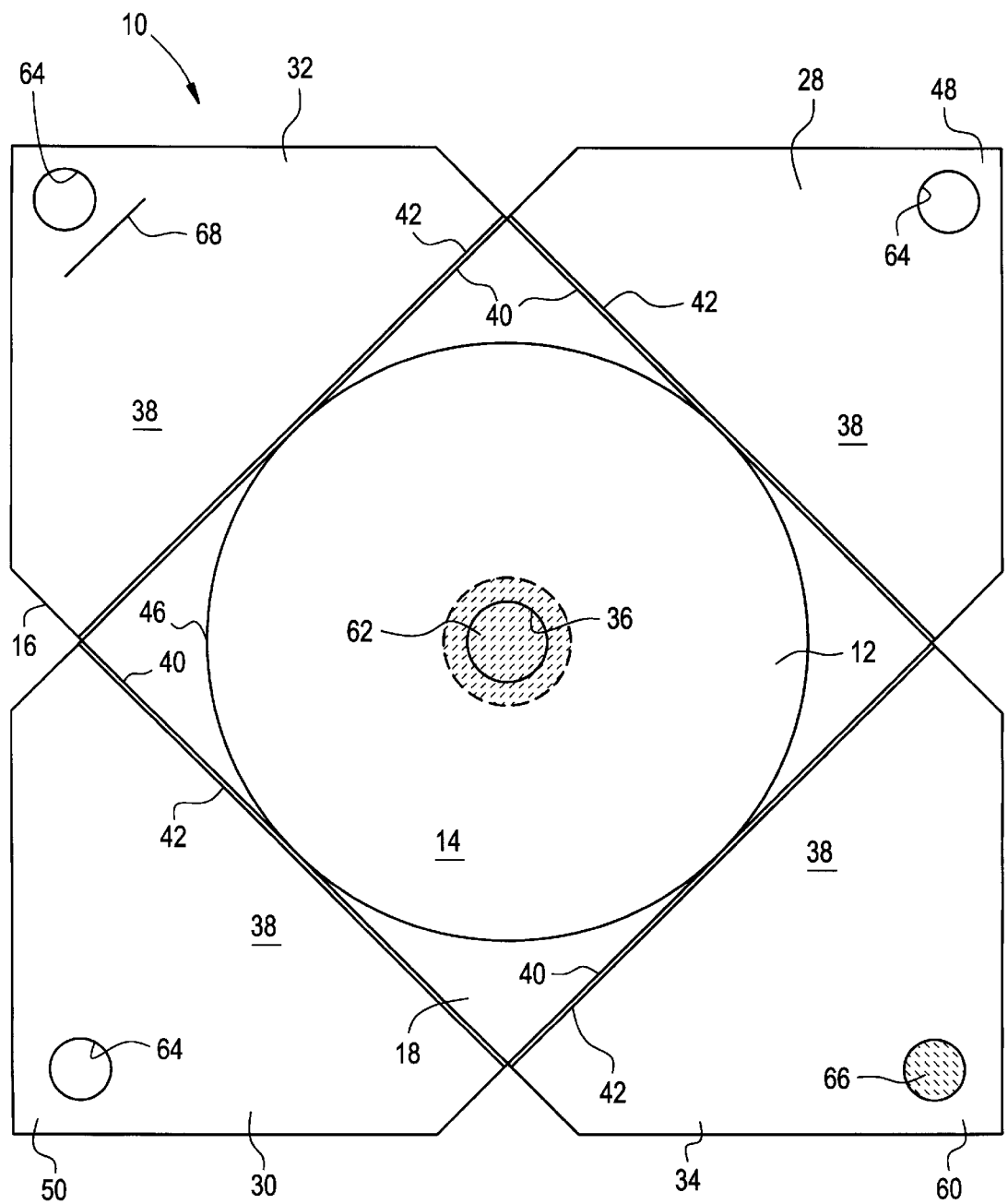
FIG. 9 is a top plan view of a second embodiment of the compact disc package of the present invention, illustrating the package in an open position for receiving the compact disc on a disc support area of the package having first and second pairs of flaps extending from the sides of the disc support area.

Now referring to FIGS. 9–15, there is illustrated another embodiment of the compact disc package 10 in which like numerals shown in FIGS. 9–15 designate like elements shown in FIGS. 1–8 and discussed above for the compact disc package 10. In the embodiment of the package 10 shown in FIG. 9, the disc support area 18 includes at the center thereof a support pad 62, fabricated of a loop element of a conventional Velcro attachment. As seen in FIG. 9, the pad 62 has a circular configuration with a diameter greater than the diameter of hole 36 in disc 12, but less than the maximum diameter of the unreadable portion of the disc 12 around the hole 36.

The first pair of flaps 28, 30 is provided with circular openings 64. The openings 64 are positioned on the flap free edges 48, 50 so that the distance between the center of each opening 64 and the adjacent fold line 42 is equal to the distance between the center of the support pad 62 and the adjacent score line 40. Similarly, flap 32 of the second pair of flaps 32, 34 is provided with an opening 64 also located in the same position on the flap 32 as the openings 64 in the flaps 28, 30.

On the flap 34 opposite the flap 32, a pad 66 of a hook element of the Velcro attachment is secured to the flap free edge 60. The distance between the center of the Velcro pad 66 and the adjacent fold line 42 is equal to the distance between the center of the Velcro pad 62 and the adjacent fold line 40. Also as seen in FIG. 9, the diameter of each of the openings 64 is greater than the diameter of the hole 36 in disc 12, but less than the diameter of the underlying support Velcro pad 62. In turn, the Velcro pad 66 on flap 34 is smaller in diameter than the diameter of the holes 64 on flaps 28, 30, and 32. Also as shown in FIG. 9, the flap 32 is also provided with a slit 68 positioned adjacent the hole 64 and extending parallel to the adjacent fold line 42.

The embodiment of the package 10 shown in FIG. 9 is in an open position to receive the disc 12 on the Velcro pad 62 which is secured on the disc support area 18. Preferably, the Velcro pad 62 has a preselected height to support the disc 12 removed from contact with area 18 except at the disc outer peripheral edge 46. When the disc 12 is inserted on the pad 62 in the open position of the package 10, the pairs of flaps 28, 30 and 32, 34 are substantially positioned in the plane of the support area 18. Therefore, there is no chance that the flaps 28, 34 contact the readable surface 14 of the disc 12 as it is inserted into the open package 10.

Figure 10:
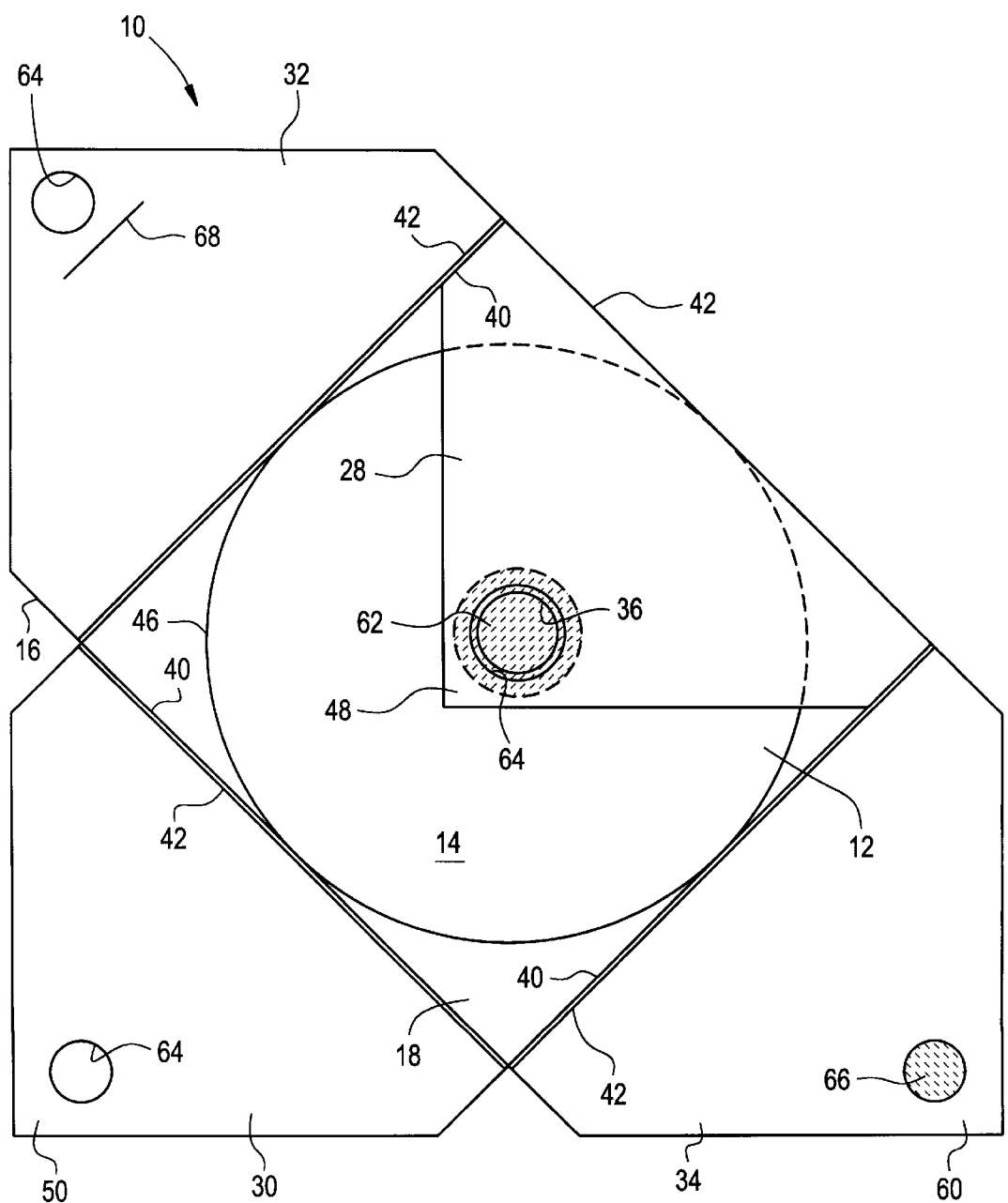
FIG. 10 is a plan view similar to FIG. 9, illustrating the first step in folding one of the flaps in a first pair of flaps into overlying relation with the disc where a Velcro pad supports the area around the hole in the center of the disc.
Figure 11:
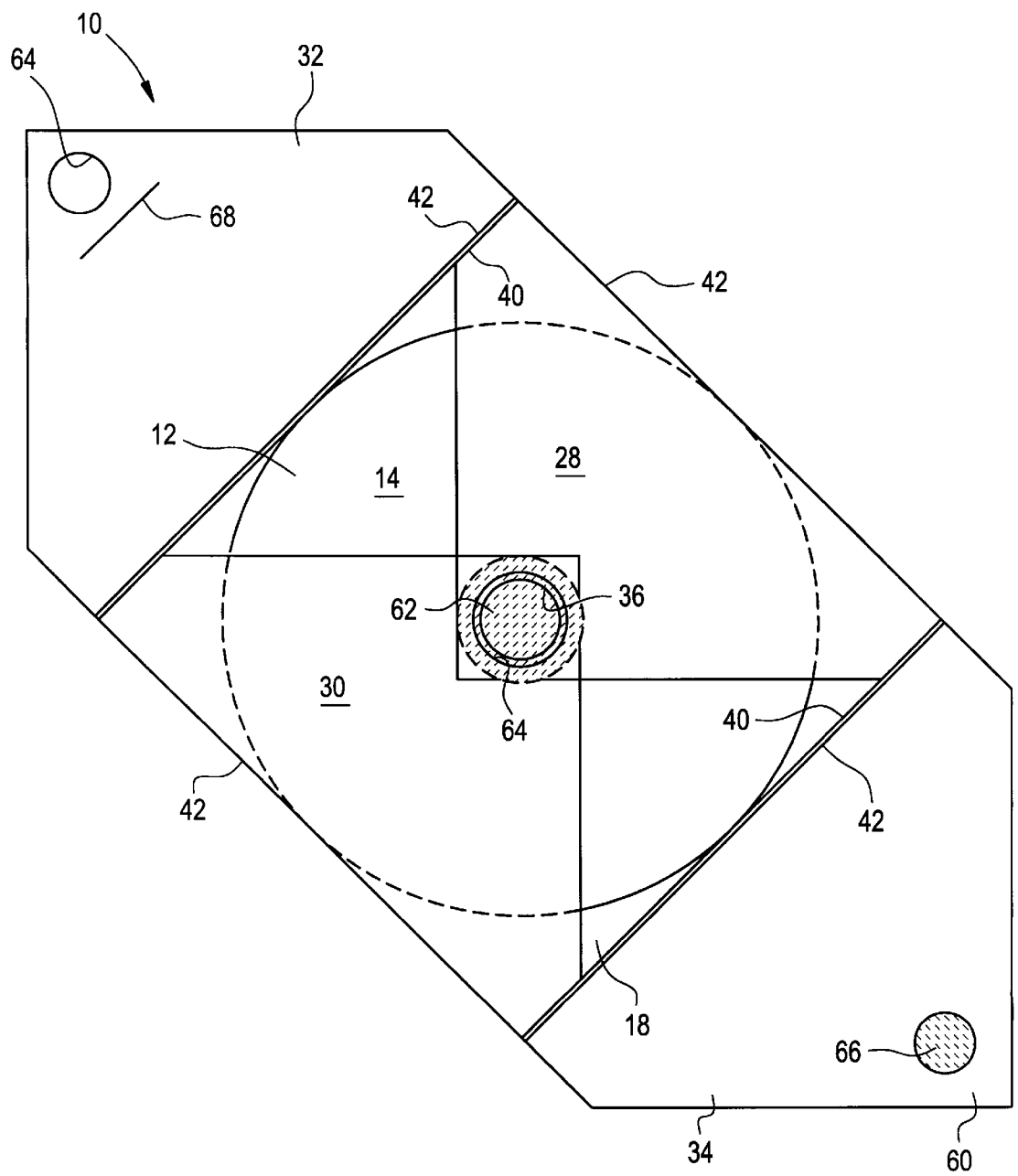
FIG. 11 is a top plan view of the compact disc package, illustrating the step of folding a second flap of the first pair of flaps where a hole in the second flap is aligned with the hole in the first flap and the Velcro pad is exposed through the two holes.
Figure 12:
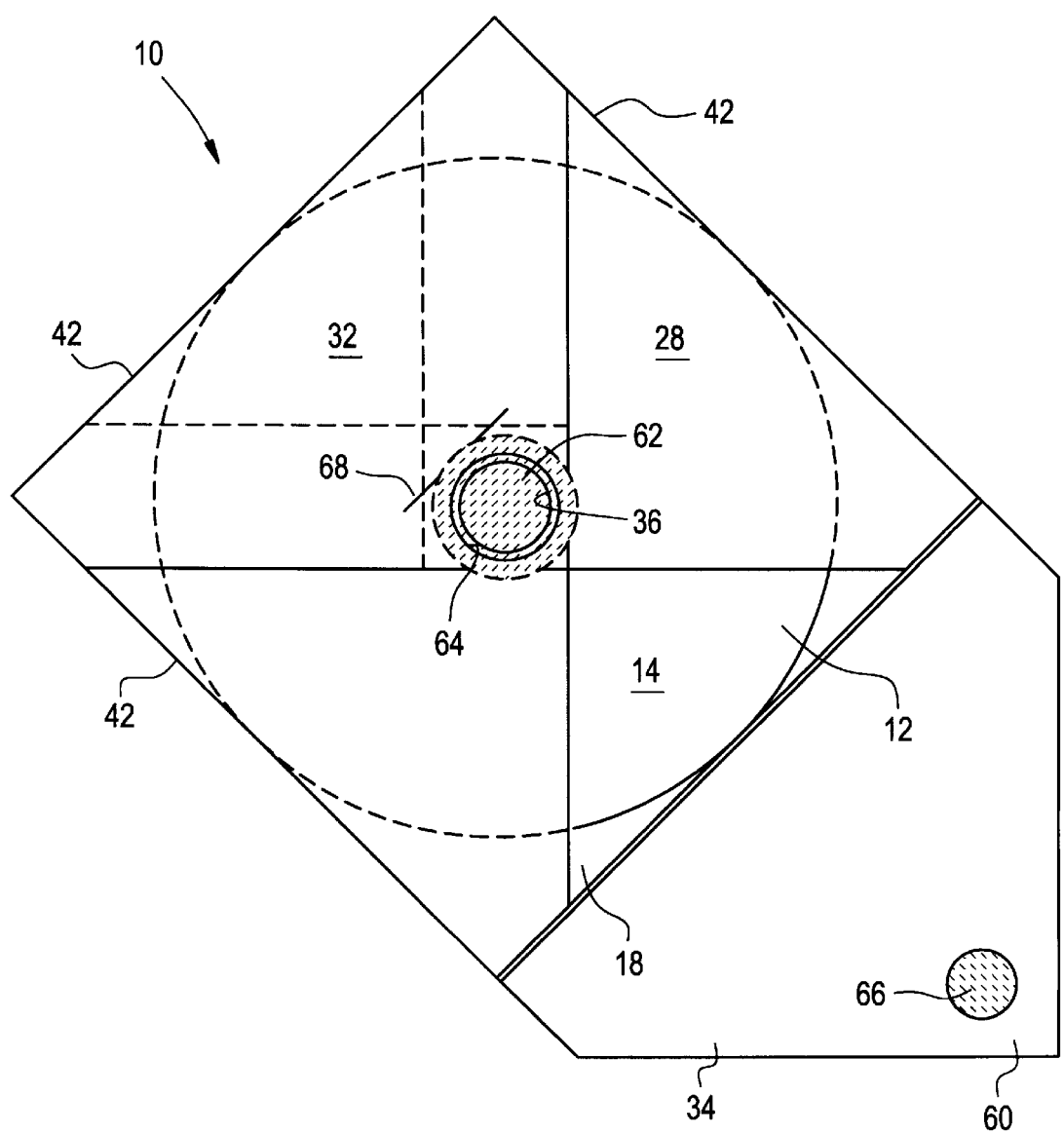
FIG. 12 is a top plan view of the second embodiment of the compact disc package, illustrating the step of folding one of the second pair of flaps to position a hole in the flap in alignment with the holes of the folded flaps.
Figure 13:
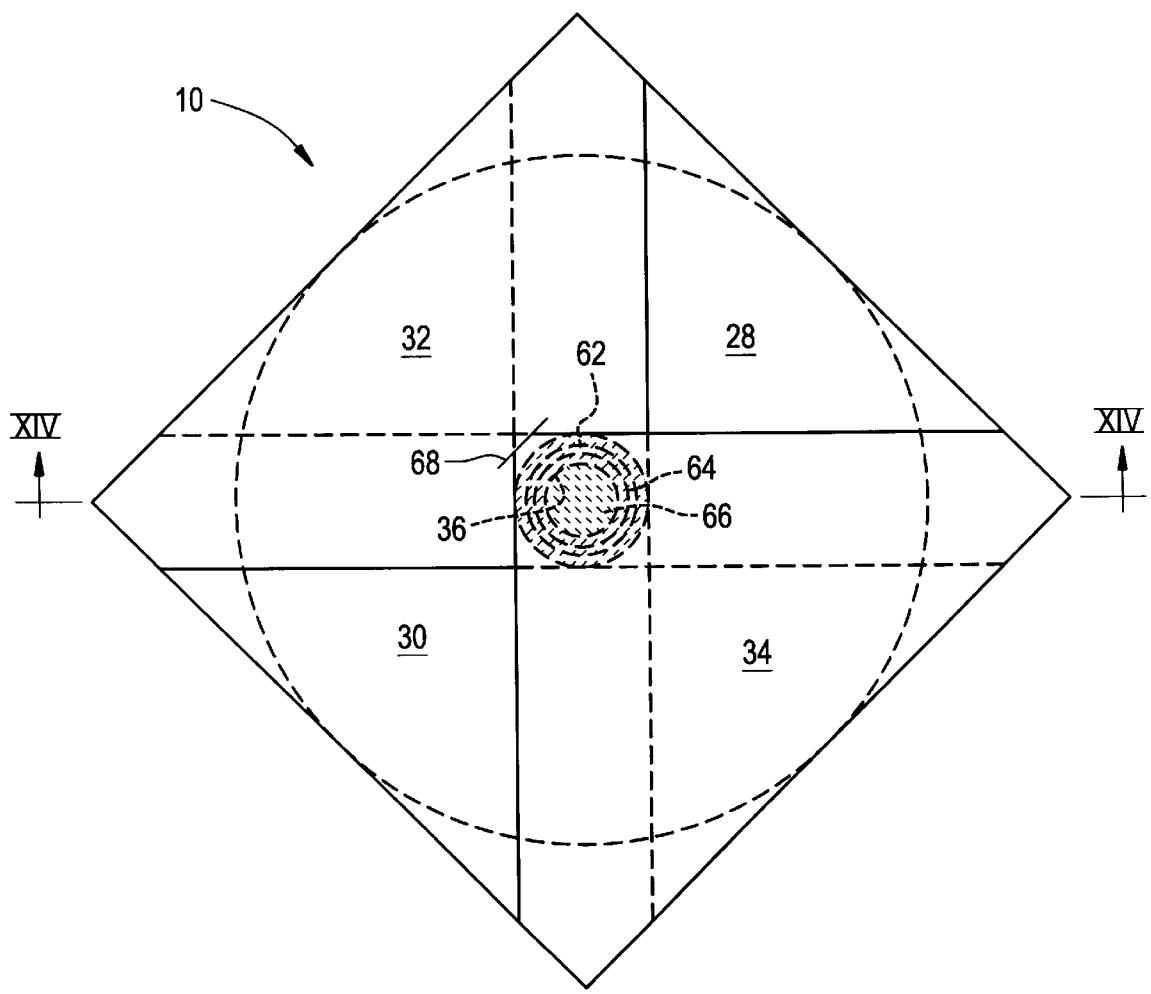
FIG. 13 is a top plan view of the second embodiment of the compact disc package in a closed position, illustrating the step of folding the final flap having a Velcro element into engagement with the corresponding Velcro pad exposed through the holes of the aligned flaps to close the package around the compact disc.
Figure 14:
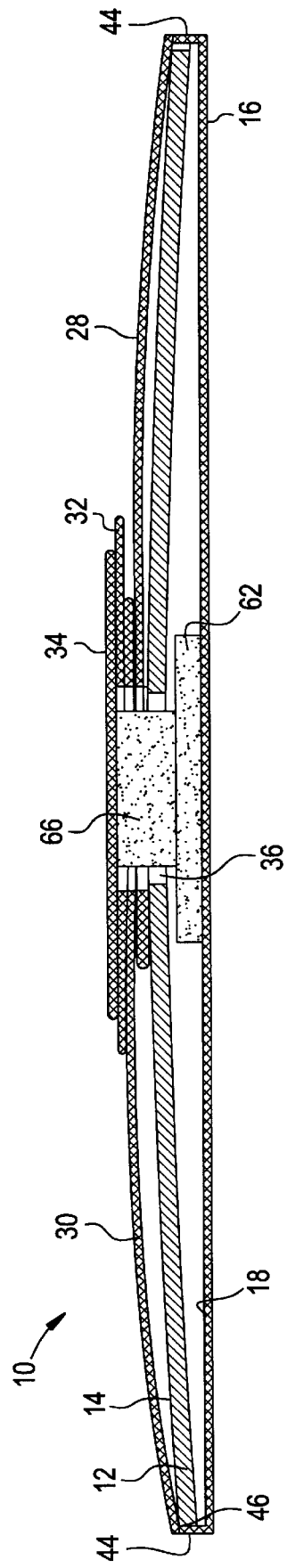
FIG. 14 is a sectional view in side elevation taken along XIV—XIV of FIG. 13, illustrating the engagement of tile opposing Velcro elements to close the package and provide a support for maintaining the interior surfaces of the folded flaps out of contact with the readable surface of the compact disc.

As with the embodiment of the present invention shown in FIG. 1, the package 10 shown in FIG. 9 is dimensioned so that the peripheral edge 46 of the disc 12 is tangent to the first fold lines 40. Once the disc 12 is positioned on the support area 18, the flap 28 is first folded about the double fold lines 40, 42 into contact with the support pad as shown in FIG. 10. Thereafter, flap 30 is folded into overlying relation with the folded flap 28 as shown in FIG. 11. Again, the hole 64 in flap 30 exposes the Velcro pad 62 therebelow. Thereafter as shown in FIG. 12, the flap 32 is folded into overlying relation with the folded flaps 28 and 30 with the hole 64 centered on the Velcro pad 62. With the three flaps 28, 30 and 32 folded into overlying relation with the Velcro pad 62, the Velcro pad 62 is visible and exposed through the aligned holes 64. This permits the flap 34 to be folded so that the corresponding Velcro pad 66 engages the exposed area of the Velcro pad 62 through the openings 64 to close the package 10 as shown in FIG. 13.

Figure 15:
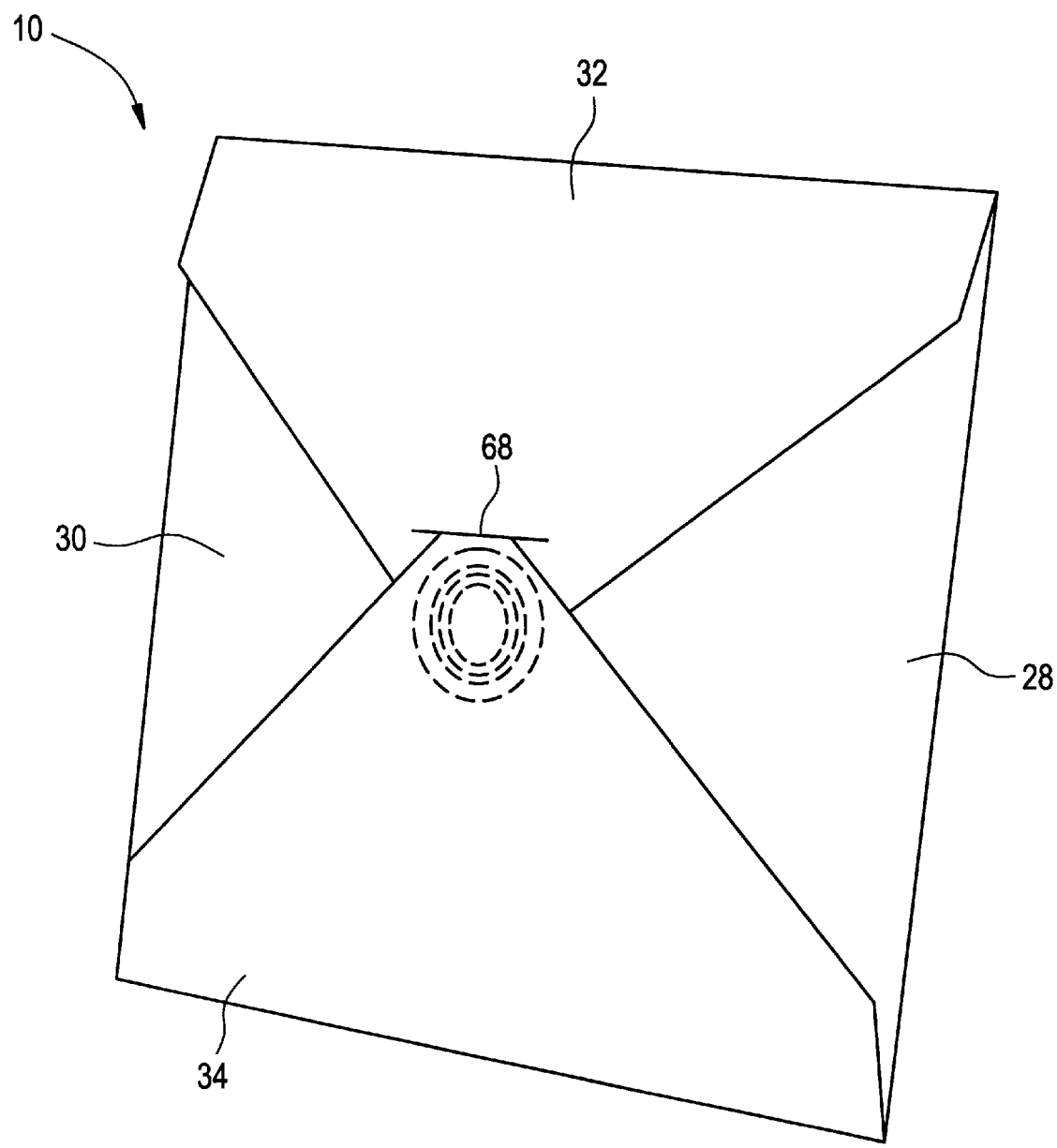
FIG. 15 is an isometric view of the second embodiment of the compact disc package in the closed position.

Engagement of the Velcro pad 66 with the corresponding Velcro pad 62 closes the package 10. The disc 12 is securely contained in an air chamber formed by the folded flaps 28–30 removed from contact with the readable surface 14 of the disc 12. To secure closure of the package 10, the free edge 60 of flap 34 extends through a slit 68 in flaps 32 until the flap 34 is restrained from further movement through the slit 68 on flap 32. The engagement of the flap free edge 60 in the slit 64 is shown in FIG. 15. Thus, the second embodiment of the package 10 also provides for secure enclosure of the disc 10 in a package that prevents its lateral movement and encloses the disc 12 within a multi-layered chamber forming a cushion of air around the disc 12 to protect it from damage and, particularly, wear of the disc readable surface 14 by sliding contact with the interior surfaces of the package 10.

In the embodiments of the closed package 10 shown in FIGS. 8 and 15, the package has a number of surfaces to which an address or advertising may be affixed to facilitate shipping of the package 10 in the mail and identification of the contents of the package 10. With the releasable enclosures provided by the package 10 of the present invention, the package can be opened and closed repeatedly without creating wear of the readable surface 14 of the disc 12. In the open position of the package as shown in FIGS. 1 and 9, the disc 12 is placed on the support area 18 eliminating any sliding movement of the package surfaces with the disc readable surface 14.

When closure of the package 10 is completed, the disc 12 is substantially immovable within the package 10. It cannot shift laterally as it is constrained around its peripheral edge 46 by the vertical edge 44 of the package 10 formed by the double fold lines 40, 42. Also, in the closed position the readable surface 14 of disc 12 is removed from contact with the surrounding package, yet the package securely holds the disc in place to form a cushion of air that protects the disc 12 during storage and handling.

According to the provisions of the patent statutes, I have explained the principle, preferred construction and made of operation of my invention and have illustrated and described what I now consider to represent its best embodiments. However, it should be understood that, within the scope of the appended claims, the invention may be ,practiced otherwise than as specifically illustrated and described.

I claim:

1. A package for holding a compact disc comprising, a unitary rectangular sheet of foldable material die cut to form a disc support area, said disc support area having four sides of equal length substantially corresponding in length to the diameter of the compact disc to facilitate positioning and removal of the compact disc from said support area, a triangular flap extending from each side of said disc support area, said flap having a base portion integrally connected to said disc support area by a fold line permitting articulation of said flap relative to said disc support area, said flap having a free edge, a first pair of said flaps extending from opposite sides of said disc support area, a second pair of said flaps extending from opposite sides of said disc support area, said first and second pairs of flaps movable to an open position exposing said disc support area to receive the compact disc removed from contact with said first and second flaps, said first and second pairs of flaps movable to a closed position where said first pair of flaps is folded into abutting contact with one another in a position supported above and out of contact with the compact disc followed by said second pair of flaps folded over said first pair of folded flaps and out of contact with the compact disc, and said second pair of flaps connected to one another in the closed position.

2. A method of packaging a compact disc comprising the steps of, positioning a compact disc on a disc support area of a sheet of foldable material with a readable side of the compact disc facing upwardly and removed from contact with the disc support area, extending from the disc support area first and second pairs of oppositely positioned flaps integrally connected to the disc support area, folding the first and second pairs of flaps from an open position providing access to the disc support area for positioning the compact disc thereon to a closed position where the first and second pairs of flaps are folded into contact with the peripheral edge of the compact disc to restrain movement of the compact disc on the disc support area, folding the first pair of flaps into abutting contact with one another and out of contact with the readable surface of the compact disc in the closed position, folding the second pair of flaps into overlying relation with the first pair of flaps to maintain the second pair of folded flaps out of contact with the readable surface of the compact disc, and connecting the second pair of folded flaps to one another in a closed position.

3. A package for holding a compact disc comprising, a unitary rectangular street of material die cut to form a disc support area having four sides of equal length corresponding substantially in length to the diameter of the compact disc, a triangular flap extending from each side of said disc support area, said triangular flap having a base portion integrally connected to said disc support area by a fold line permitting articulation of said flap relative to said base portion, said flap having a free edge projecting from said base portion, a first pair of flaps position ed on opposite sides of said disc support area having a length extending from said base portion to said free edge greater than one half the diameter of the disc, said first pair of flaps being folded about said base portion into overlying relation above the disc until said opposed free edges abut one another to restrain further movement of said flaps and bias said flaps away from the surface of the disc, a second pair of flaps positioned on opposite sides of said disc support area and having a length extending from said base portion to said free edge greater than one half the diameter of the disc, and one free edge of said second pair of flaps having a slot extending across said free edge substantially parallel to said base portion and a second free edge of said second pair of flaps extending into said slot until movement of said flap second free edge is restrained to bias said second pair of flaps away from the surface of said disc to close the package forming a cushion of air around the disc.

4. A package for holding a compact disc as set forth in claim 1 which includes, said fold line positioned adjacent to said disc support area, a second fold line positioned parallel to said first mentioned fold line and adjacent to said flap base portion to form a double fold line connecting said flap to said disc support area to permit articulation of said flap relative to said disc support area.

5. A package for holding a compact disc as set forth in claim 4 in which, said double fold line forms a vertical edge at each longitudinal edge of said disc support area.

6. A package for holding a compact disc as set forth in claim 5 in which, said first mentioned fold line and said second fold line are spaced a preselected distance apart to receive the disc therebetween in contact with said vertical edge.

7. A package for holding a compact disc as set forth in claim 5 in which, said vertical edge between said double fold line abuts the disc at said four sides of said disc support area to confine the disc to said disc support area.

8. A package for holding a compact disc as set forth in claim 1 in which, said first and second pairs of flaps in said closed position create an air chamber around the disc where the folded first and second pairs of flaps are removed from contact with the disc.

9. A package for holding a compact disc as set forth in claim 1 in which, said first pair of flaps each has a length greater than one half the diameter of the disc, and said first pair of flaps in said closed position abut at said free edges thereof to interfere with one another when folded from the open position to the closed position to prevent said first pair of flaps from moving into contact with the disc.

10. A package for holding a compact disc as set forth in claim 9 in which, said first pair of flaps contact one another in the closed position to create a bulging of said flaps and form. a rigid chamber enveloping the disc.

11. A package for holding a compact disc as set forth in claim 1 which includes, means for connecting said second pair of flaps at said free edges thereof in overlying relation with said first pair of flaps to lock said second pair of flaps in position above said first pair of flaps and restrain relative movement of all of said flaps.

12. A package for holding compact disc as set forth in claim 1 which includes, a Velcro loop element pad secured at a center of said disc support area, said free edges of said first pair of flaps having openings therein for positioning in overlying abutting relation with said pad when folded to the closed position, said pad exposed in said overlying openings in said first pair of flaps, and said free edges of said second pair of flaps having an opening in one flap for positioning in overlying relation with said first pair of flaps to further expose said pad and a Velcro hook element secured to a second flap to engage the exposed pad through said overlying openings when folded in the closed position to close the package.

13. A package for holding a compact disc as set forth in claim 12 which includes, means for securing said first and second pairs of flaps in the closed position at said flap free edges to enclose the disc in a multi-layered chamber forming a cushion of air around the disc.

14. A method as set forth in claim 2 which includes, connecting the first and second pairs of flaps to the disc support area to permit articulation of the flaps relative to the disc support area.

15. A method as set forth in claim 2 which includes, restraining movement of the disc on the disc support area when the first and second pairs of flaps are in the closed position and removed from contact with the readable side of the disc.

16. A method as set forth in claim 2 which includes, creating a cushion of air around the disc when the first and second pairs of flaps are in the closed position removed from contact with the readable side of the disc.

17. A method as set forth in claim 2 which includes, folding the first pair of flaps into the closed position where free edge portions of the flaps interfere with one another to restrain movement of the flaps into contact with the readable side of the disc.

18. A method as set forth in claim 2 which includes, releasably connecting free edge portions of the first and second pairs of flaps when folded in the closed position, and maintaining the connected flaps in the closed position removed from contact with the readable side of the disc.

19. A package for holding a compact disc as set forth in claim 3 which includes, means for constraining articulation of said first pair of flaps by interfering movement of the flaps displaced from the surface of the disc to form an air chamber above the surface.

20. A package for holding a compact disc as set forth in claim 3 which includes, means for connecting said free edges of said first and second pairs of flaps to one another in a position enclosing the disc and removed from contact with the surface of the disc.

* * * * *

UNITED STATES PATENT AND TRADEMARK OFFICE
CERTIFICATE OF CORRECTION

PATENT NO.  : 6,016,908
DATED       : January 25, 2000
INVENTOR(S) : Ralph R. Gaetano It is certified that error appears in the above-indentified patent and that said Letters Patent is hereby corrected as shown below:

Claim 3, column 11, line 8, after "rectangular" delete 'street' and insert --sheet--.

Claim 3, column 11, line 19, after "flaps" delete 'position ed' and insert --positioned--.

Signed and Sealed this

Seventeenth Day of April, 2001

Attest:

NICHOLAS P. GODICI

*Attesting Officer*     *Acting Director of the United States Patent and Trademark Office*